(12) United States Patent
Barker

(10) Patent No.: US 6,439,643 B2
(45) Date of Patent: Aug. 27, 2002

(54) MECHANISM FOR THE RETRACTABLE TOP OF AN OPEN AUTOMOBILE

(76) Inventor: Dennis G. Barker, 416 B AABC, Aspen, CO (US) 81611

( * ) Notice: Subject to any disclaimer, the term of this patent is extended or adjusted under 35 U.S.C. 154(b) by 13 days.

(21) Appl. No.: 09/750,931

(22) Filed: Dec. 28, 2000

Related U.S. Application Data

(60) Provisional application No. 60/175,253, filed on Jan. 10, 2000.

(51) Int. Cl.[7] ................................................ B60T 7/12
(52) U.S. Cl. .................. 296/116; 296/107.09; 296/121
(58) Field of Search ........................... 296/116, 107.09, 296/121

(56) References Cited

U.S. PATENT DOCUMENTS 5,673,959 A * 10/1997 Padlo .......................... 296/116
6,295,713 B1 * 10/2001 Hilliard et al. ......... 296/116 X

* cited by examiner

*Primary Examiner*—Joseph D. Pape
(74) *Attorney, Agent, or Firm*—Gerald E. Helget; Nelson R. Capes; Briggs and Morgan

(57) ABSTRACT

A retractable top for a Jeep® CJ-7® or Wrangler® or other vehicle with an open passenger compartment and an open rear compartment. The top attaches to the floor of the open rear compartment. A number of expanding linkage arms allow the cover to be deployed forwardly over both the rear compartment and the passenger compartment. Windscreen brackets fasten the cover to the vehicle's windscreen.

19 Claims, 9 Drawing Sheets

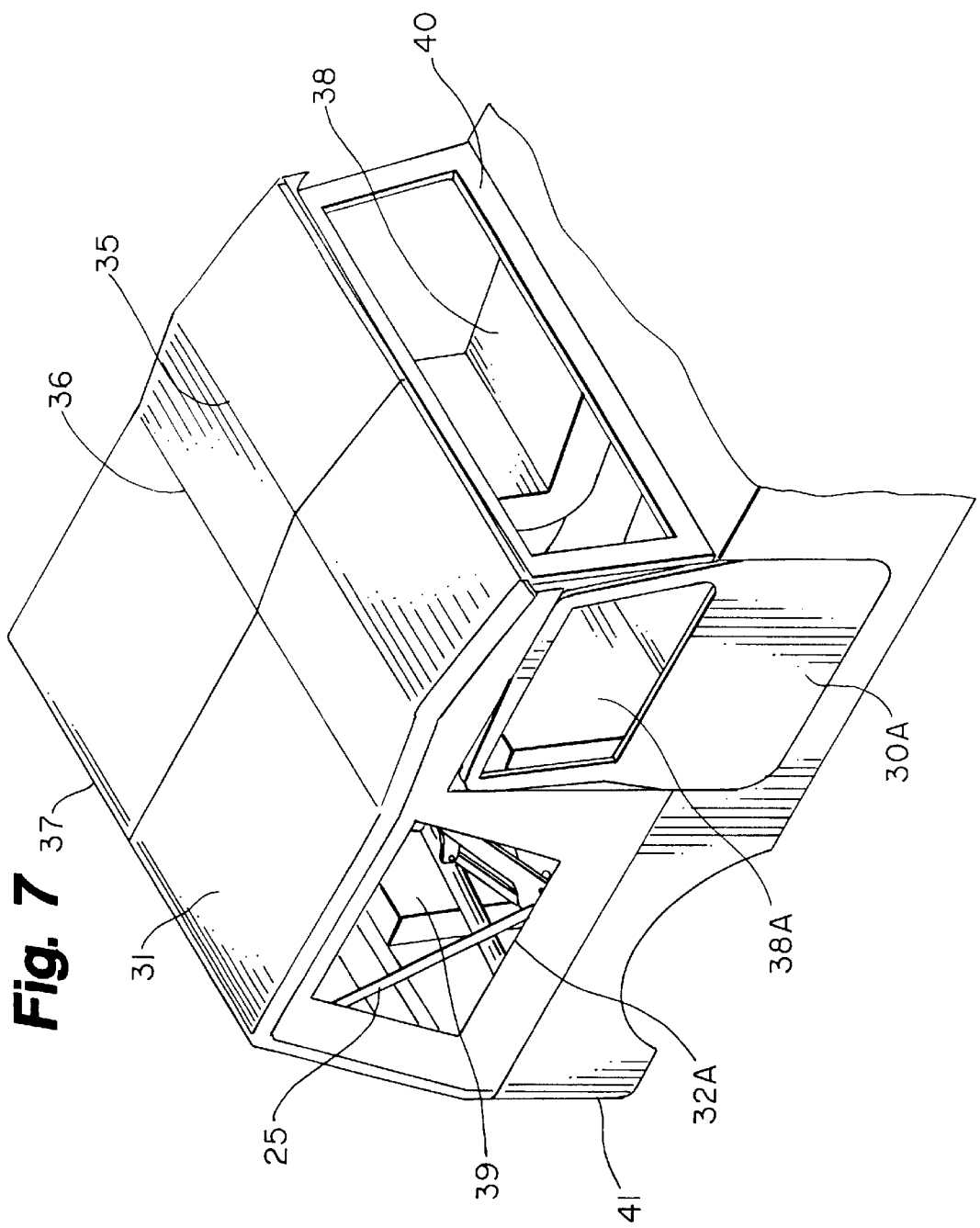

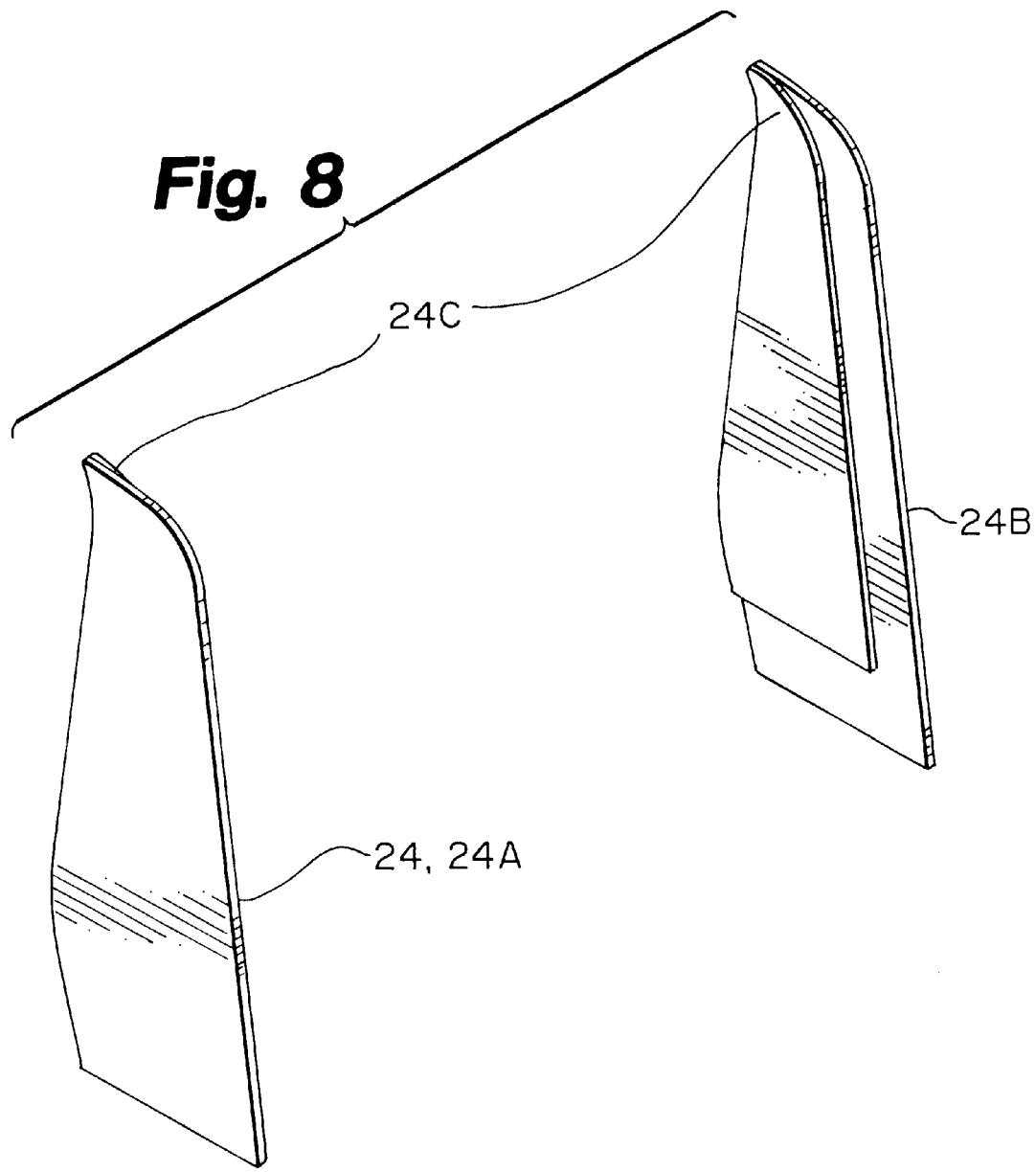

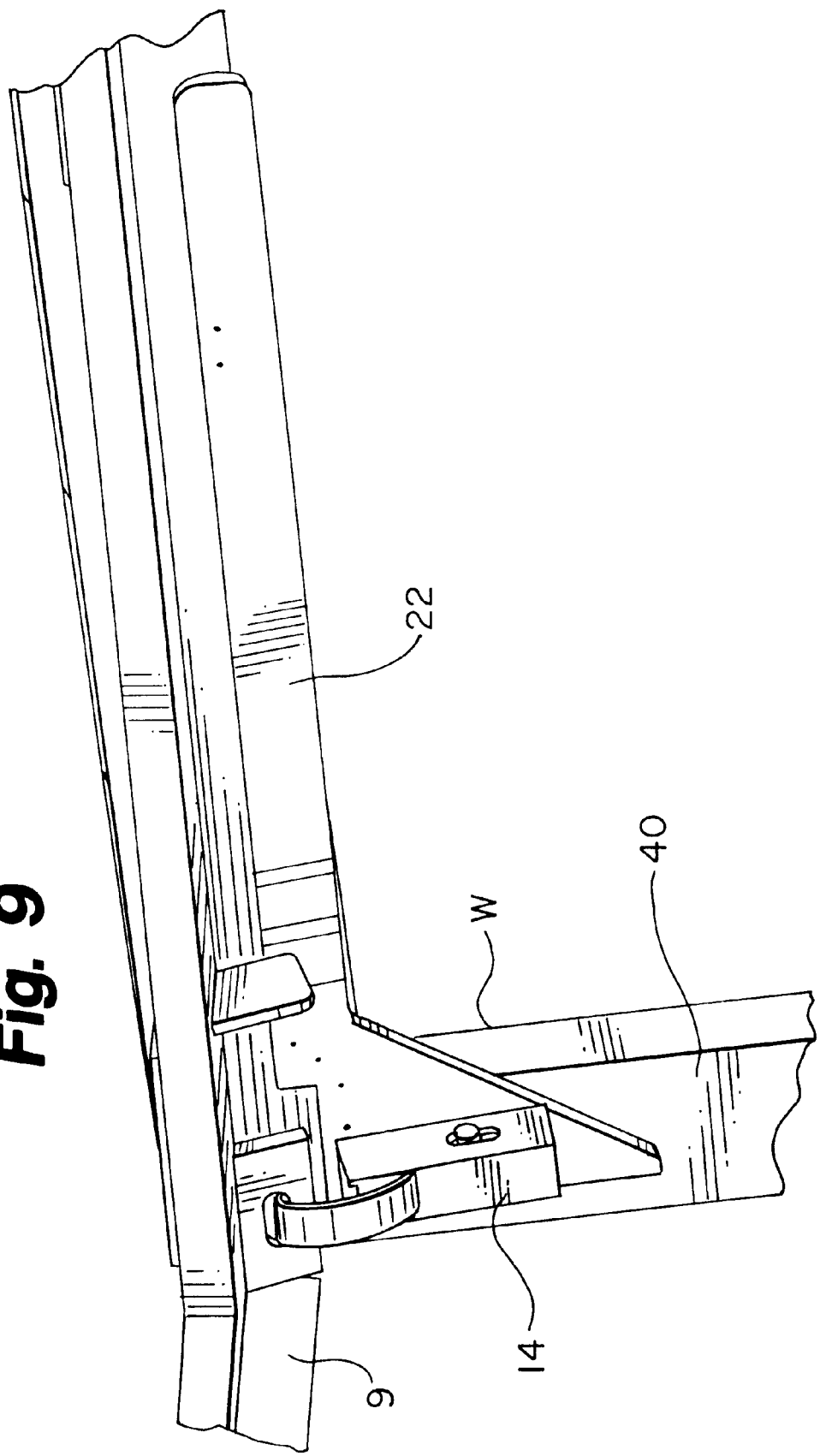

MECHANISM FOR THE RETRACTABLE TOP OF AN OPEN AUTOMOBILE

This application is a continuation of provisional patent application Ser. No. 60/175,253, filed Jan. 10, 2000.

BACKGROUND OF THE INVENTION

The present application relates to a retractable top for a vehicle, and in particular to a retractable top for the Jeep® CJ-7® or Wrangler®. These two vehicles have an open passenger compartment and an open rear compartment for carrying gear. An optional soft top is available that can be attached to the vehicle to enclose the passenger compartment, but to do so requires a number of snap fasteners to be engaged, taking several minutes. In the event of inclement weather, passengers and gear may get wet while this soft top is fastened to the vehicle.

There is a need for a retractable top for a CJ-7® or wrangle® that can be attached to the floor of the rear compartment and quickly and easily deployed over the passenger compartment.

The retractable cover must be able to rise far enough to cover the high roll bar in the rear compartment of the vehicle, yet must be compact enough in the folded state to fit within the cramped dimensions of the rear compartment. For example, the cover must rise at least twenty-nine inches to clear the roll bar, yet when folded must take up at most fourteen inches of vertical space in the rear compartment.

SUMMARY OF THE INVENTION

A retractable top for a vehicle, the vehicle resting on the ground, the vehicle having an open passenger compartment with a windscreen and door openings and an open rear compartment rearward of the passenger compartment, the rear compartment having a floor, the retractable top comprising:

a) a pair of substantially horizontal support plates attachable to the floor of the rear compartment and a substantially vertical base plate attachable to each of the substantially horizontal support plates;

b) a plurality of expanding linkage arms adapted to moving the retractable top from a fully retracted position in which the retractable top is folded upon itself within the open rear compartment to a fully deployed position covering the passenger compartment; and c) right and left windscreen brackets attachable to the vehicle's windscreen and right and left windscreen clips locking the retractable top to the respective right and left windscreen brackets.

A principal object and advantage of the present invention is that is attachable to an unmodified Jeep® CJ-7® or Wrangler®.

Another principal object and advantage of the present invention is that it can be deployed from a retracted position in a matter of seconds.

Another principal object and advantage of the present invention is that it takes up very little vertical space in the vehicle's rear compartment when the cover is retracted. Thus, it does not block the driver's rear view of the road.

Another principal object and advantage of the present invention is that it seals the passenger compartment from the sides as well as from the top.

Another principal object and advantage of the present invention is that it has sufficient vertical displacement to clear a roll bar in the rear compartment.

BRIEF DESCRIPTION OF THE DRAWINGS

FIG. 7 is front perspective view of the vehicle, with the retractable top in the deployed position;

FIG. 8 is a detail of the left and right door brackets of the present invention; and FIG. 9 is a detail of the attachment of the top frame of the present invention to the vehicle's windscreen.

DETAILED DESCRIPTION OF THE PREFERRED EMBODIMENT

Figure 1:
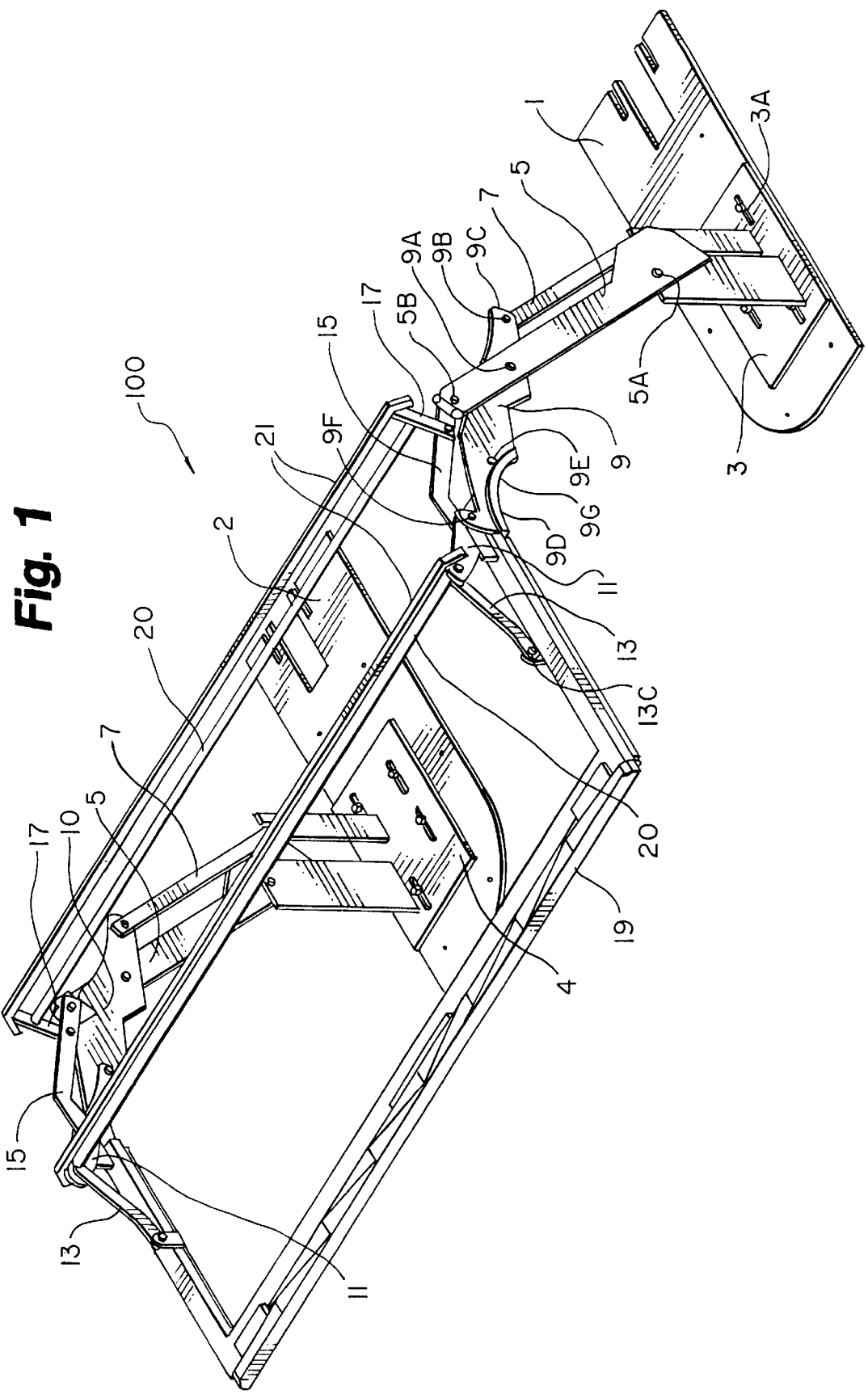
FIG. 1 is a perspective view of the retractable top of the present invention, shown in the deployed position, with the fabric cover removed to show internal parts.

The retractable top of the present invention is generally shown in the Figures as reference numeral 100.

Figure 4:
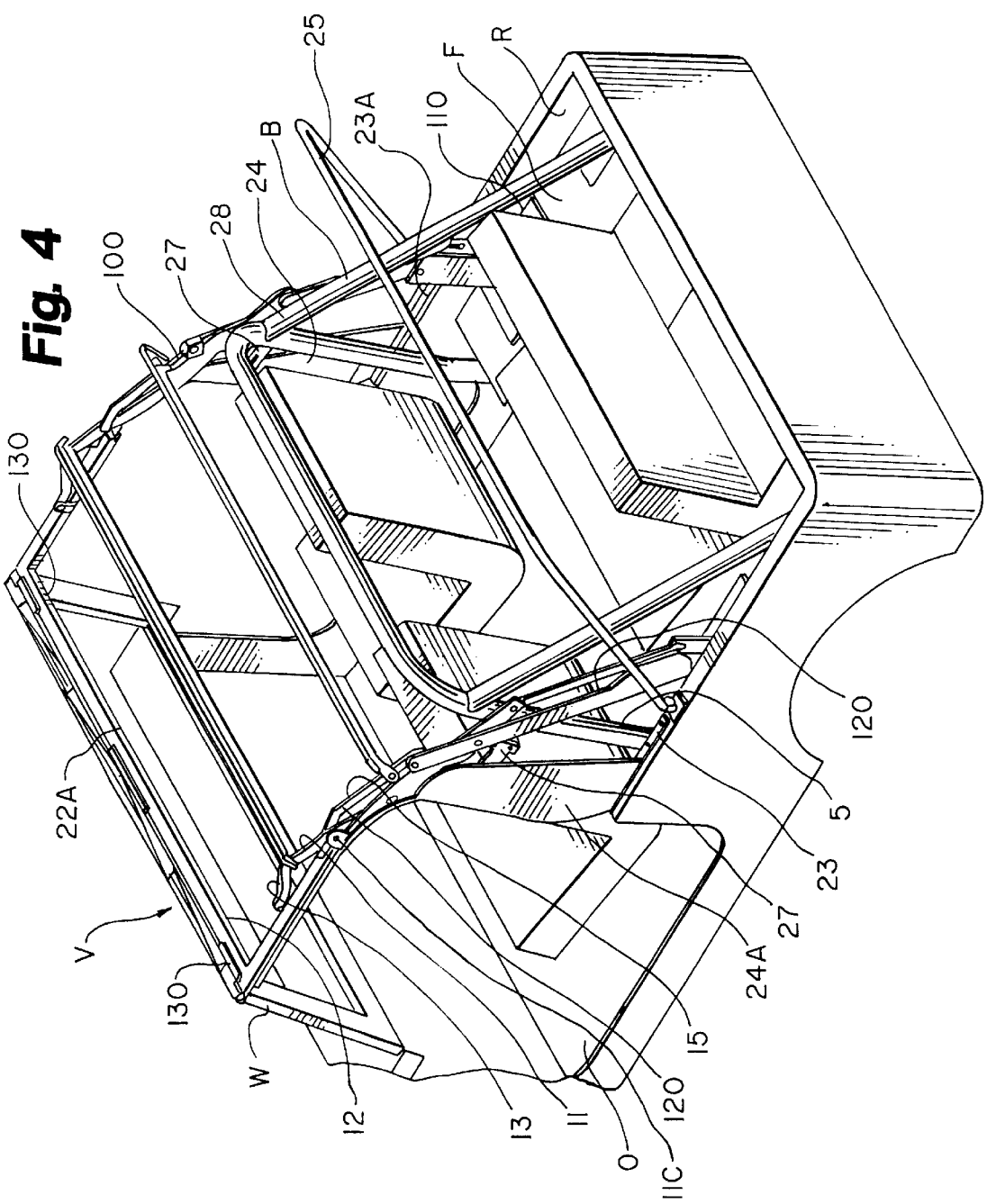
FIG. 4 is a perspective view of a vehicle with the retractable top in the deployed position, with the fabric cover removed.
Figure 5:
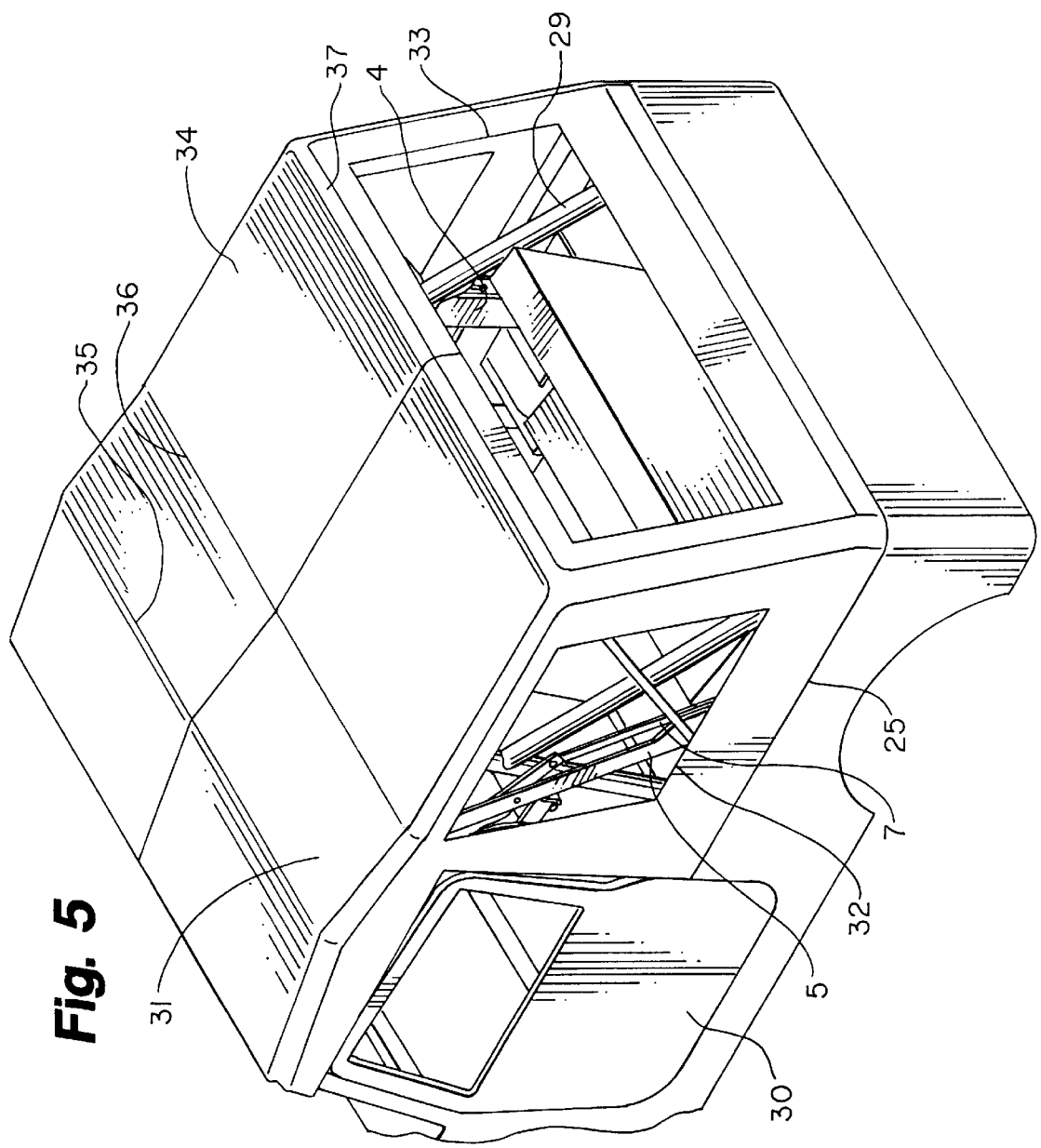
FIG. 5 is similar to FIG. 4, but shows the fabric cover in place.

Turning to FIG. 4, a vehicle V is shown, having an open passenger compartment P with a windscreen W and door openings O and an open rear compartment R rearward of the passenger compartment P, the rear compartment R having a floor F.

A retractable top 100 is attached to the floor F of the open rear compartment R by attaching means 110.

Figure 3:
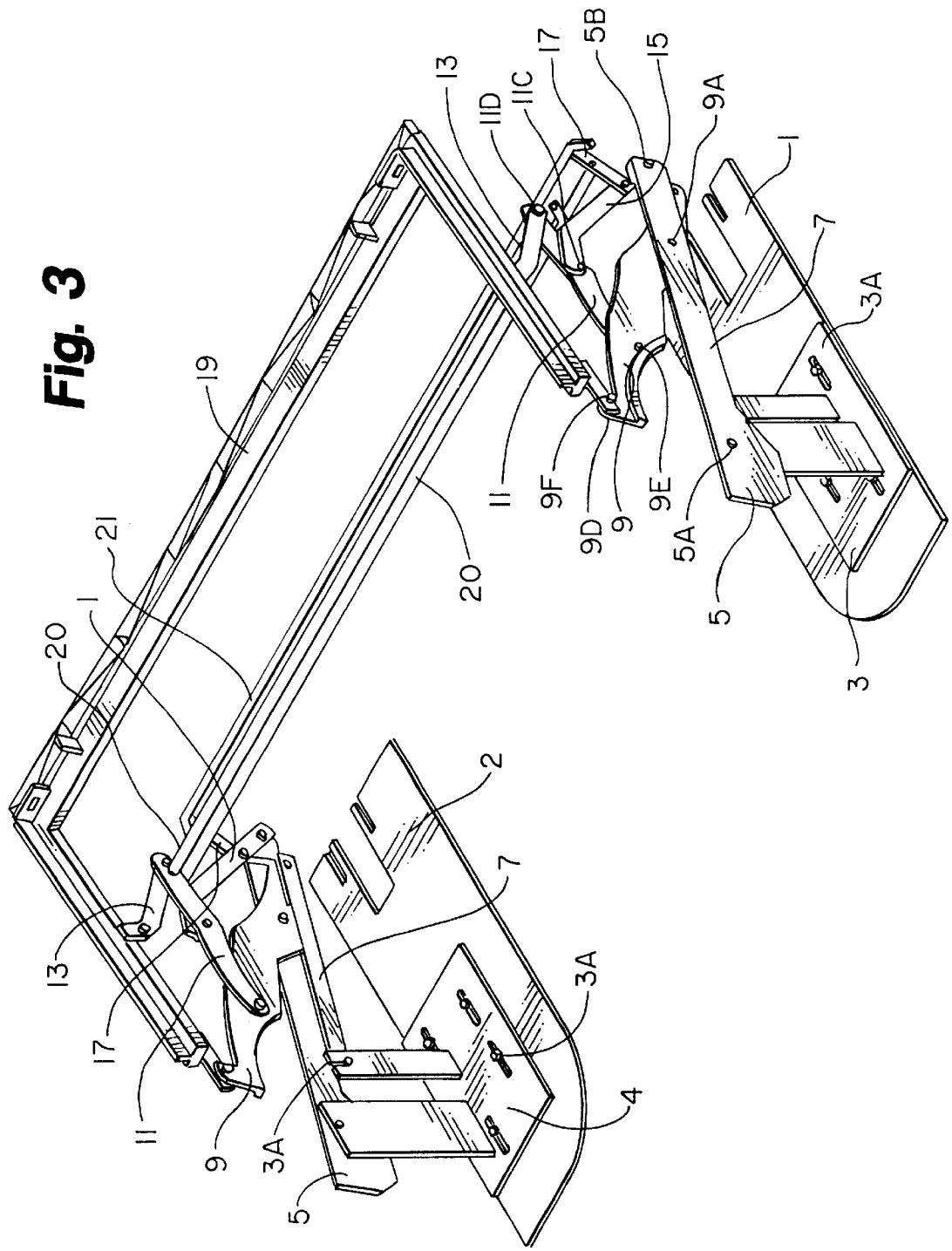
FIG. 3 is similar to FIG. 1, but shows the retractable top approaching the retracted position.

A plurality of expanding linkage arms 120 are adapted to move the retractable top 100 from a fully retracted position (FIGS. 3 and 6) to a fully deployed position (FIGS. 1 and 4). In the fully retracted position, the retractable top 100 is folded upon itself within the rear compartment R. In the fully deployed position, the retractable top 100 covers the passenger compartment P.

The retractable top 100 also comprises means 130 for removably locking the retractable top 100 to the vehicle's windscreen W.

Turning now to FIG. 1, more detail of the invention is shown.

The means 110 for attaching the retractable top 100 to the floor F preferably comprises a pair of substantially horizontal support plates 1 attachable to the floor F and a pair of substantially vertical base plates 3 attachable to the substantially horizontal support plates 1.

Figure 2:
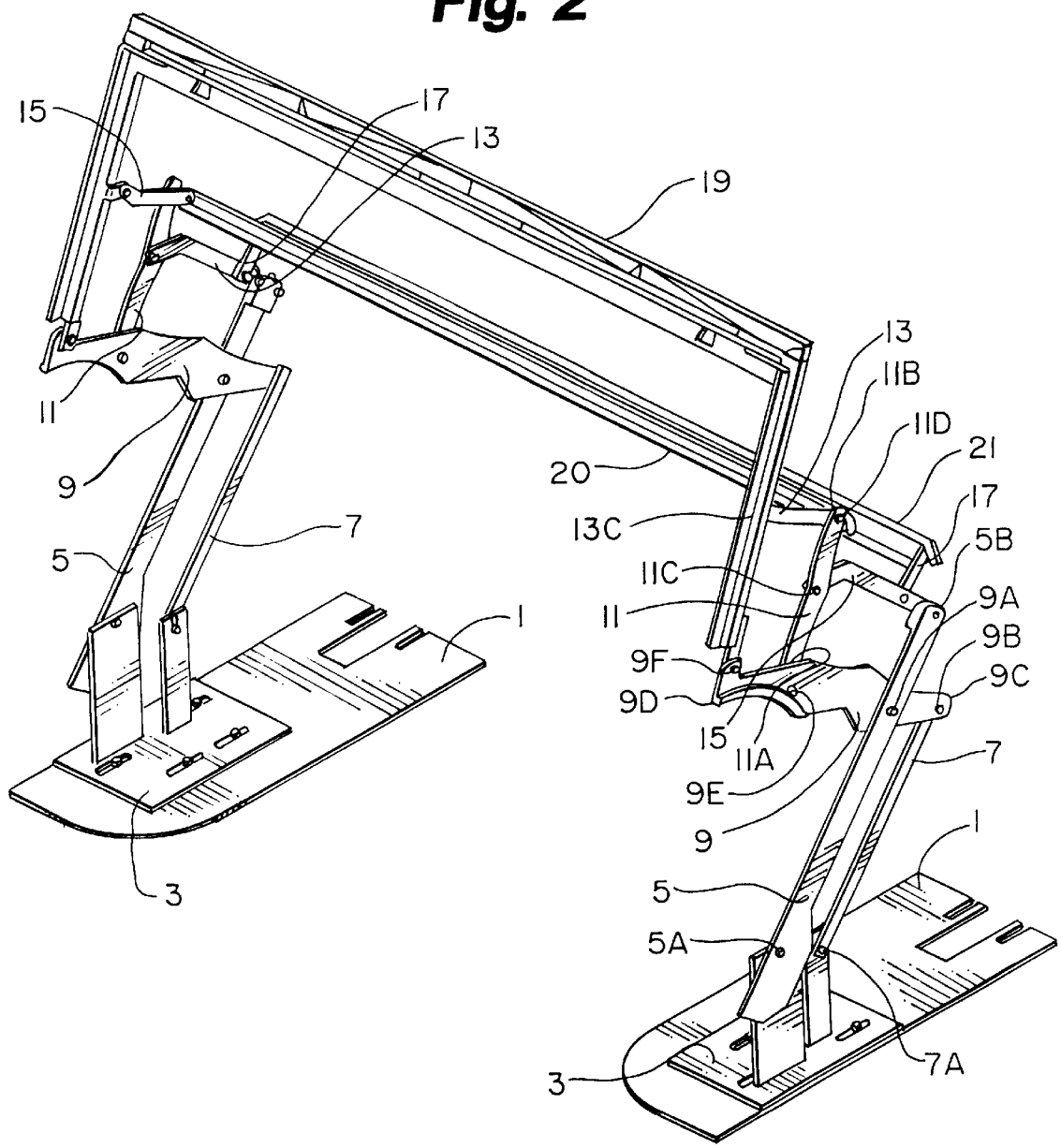
FIG. 2 is similar to FIG. 1, but shows the retractable top being retracted to a point between the deployed position and retracted position.

First 5 and second 7 linkage arms are pivotally attached to the substantially vertical base plates 3 at first 5A and second 7A pivot points. As best seen in FIGS. 1 and 2, the first 5 and second 7 linkage arms are in spaced parallel relation with one another. This is important to allow the third linkage arm 9 to remain parallel to the ground during deployment, as will be further discussed.

A third linkage arm 9 is pivotally attached to the first 5 and second 7 linkage arms at third 9A and fourth 9B pivot points. The third linkage arm 9 has a first end 9C and a second end 9D.

A fourth linkage arm 11 is pivotally attached to the third linkage arm 9 intermediate the first end 9C and second end 9D of the third linkage arm 9, at a fifth pivot point 9E. The fourth linkage arm 11 has a first end 11A and a second end 11B.

A fifth linkage arm 15 is pivotally attached to the fourth linkage arm 11 intermediate the first end 11A and the second end 11B at a sixth pivot point 11C, and is also attached to the first linkage arm 5 at a seventh pivot point 5B.

A sixth linkage arm 13 is pivotally attached to the fourth linkage arm 11 at the second end 11B of the fourth linkage arm 11 at an eighth pivot point 11D.

A windscreen and top frame 19 is pivotally attached to the sixth linkage arm 13 at a ninth pivot point 13C and is also pivotally attached to the third linkage arm 9 at a tenth pivot point 9F.

Figure 6:
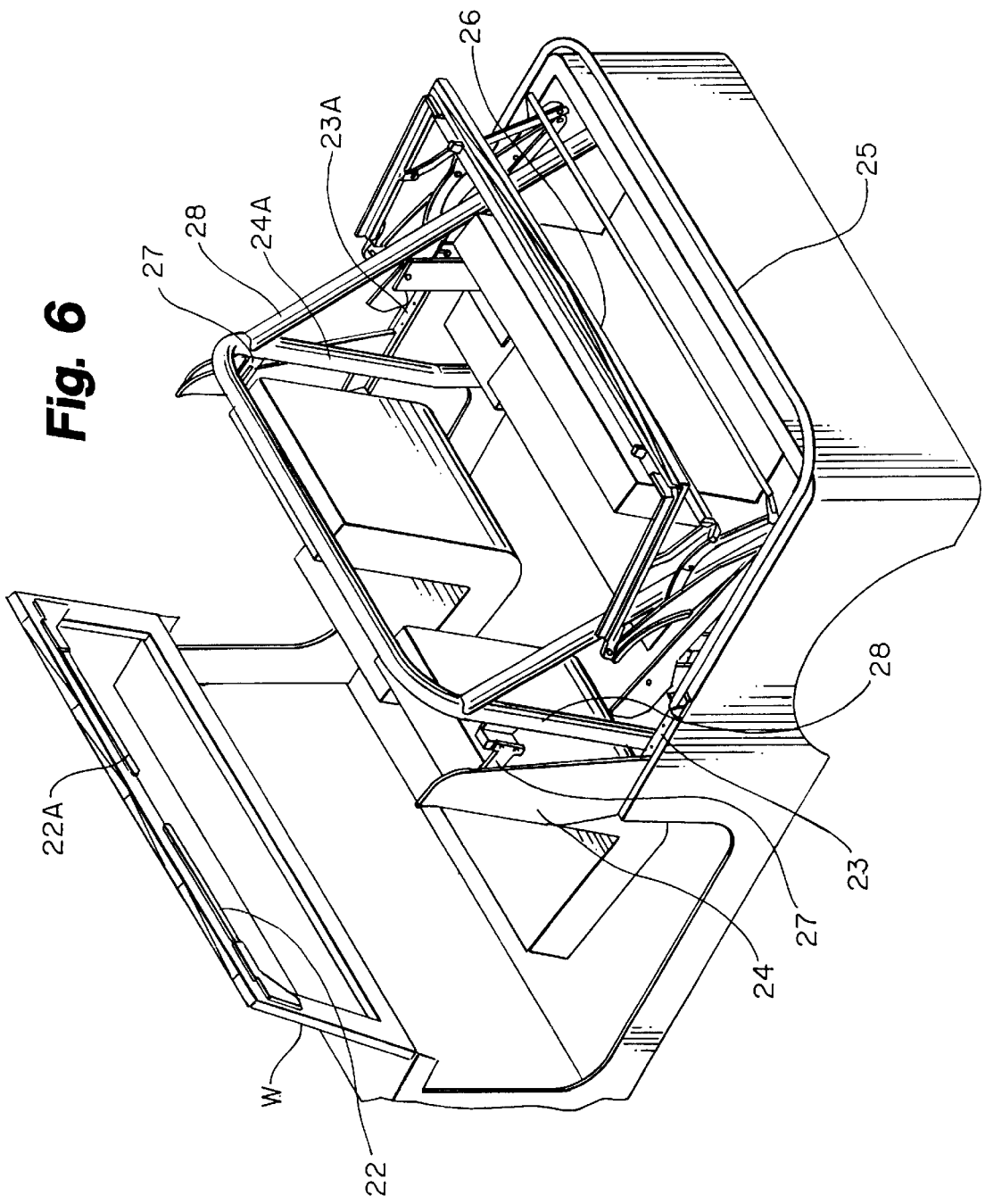
FIG. 6 is similar to FIG. 4, with the retractable top in the retracted position.

Left 22 and right 22A windscreen brackets are attachable to the vehicle's windscreen W, as best seen in FIG. 6.

Left and right windscreen clips 14 lock the windscreen and top frame 19 to the left and right windscreen brackets 22, 22A, as best seen in FIG. 9.

A fabric cover 34 is attachable to the windscreen and top frame 19. A rod 20 and bow 21 may be attachable to a seventh linkage arm 17 to support the cover 34. Another rod 20 and bow 21 may be attachable to the fourth linkage arm 11 to support the cover 34. The cover 34 may be further supported by a rear bow 25, attachable to the vehicle by chassis brackets 23.

Left 24A and right 24B door brackets (FIG. 8) are attachable to the vehicle V adjacent the door openings O. The third linkage arm 9 sealingly engages the door brackets 24A, 24B. The third linkage arm 9 has a curved portion 9G, the left and right door brackets 24A, 24B have curved portions 24C, and the curved portion 9G of the third linkage arms 9 sealingly engage the curved portions of the left and right door brackets.

The first linkage arm 5 is attached to the door bracket 24A, 24B by door bracket clamp 27. If the vehicle has a roll bar B, the top 100 may be attached to the roll bar B by roll bar clamps 28.

The substantially vertical base plates 3 have adjustment slots 3A allowing the retractable top 100 to be adjustably positioned forwardly and rearwardly in the rear compartment R.

The substantially vertical base plates 3 have adjustment slots 3A allowing the retractable top 100 to be adjustably positioned vertically within the rear compartment R.

To deploy the cover 100 from the retracted position (FIG. 3), one merely grasps the top frame 19 and pulls it upward and forwardly, causing the top frame to rotate to the position shown in FIG. 2. This also causes the third linkage arm 9 to rise essentially parallel to the ground, pivoting about the first 5 and second 7 linkage arms, and causing the first 5 and second 7 linkage arms to pivot about the base plate 3. At the same time, the rod 20 and bow 21 move upward as the fifth linkage arm 15 pivots on the fourth linkage arm 11 and the first linkage arm 5.

As the operator continues pulling on the top frame 19, the top frame 19 is moved forwardly to the windscreen, as shown in FIG. 1. The third linkage arm 9 continues to move essentially parallel to the ground. The fifth linkage arm 15 and the sixth linkage arm 13 now extend, helping to keep the top frame 19 in the deployed position and supporting the rods 20 and bows 21 which in turn engage the fabric cover 34. Finally, the operator locks the top frame 19 into position on the left and right windscreen brackets 22, 22A.

Because of the unique arrangement of the linkage arms, the cover 100 can be deployed very easily and quickly.

Applicant has found that it takes less than ten seconds to deploy the top, as compared to twenty minutes to erect the standard, removable Jeep® soft top.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A retractable top for a vehicle, the vehicle resting on the ground, the vehicle having an open passenger compartment with a windscreen and door openings and an open rear compartment rearward of the passenger compartment, the rear compartment having a floor, the retractable top comprising:
   a) means for attaching the retractable top to the floor of the open rear compartment;
   b) a plurality of expanding linkage arms adapted to moving the retractable top from a fully retracted position in which the retractable top is folded upon itself within the open rear compartment to a fully deployed position covering the passenger compartment; and
   c) means for removably locking the retractable top to the vehicle's windscreen.

2. The retractable top of claim 1, wherein the means for attaching to the floor of the rear compartment further comprises a pair of substantially horizontal support plates attachable to the floor of the rear compartment and a substantially vertical base plate attachable to each of the substantially horizontal support plates.

3. The retractable top of claim 1, wherein the plurality of linkage arms are so arranged that one of the plurality of linkage arms remains substantially parallel to the ground as the retractable top is moved from the fully retracted position to the fully deployed position.

4. The retractable top of claim 1, further comprising left and right door brackets attachable to the vehicle adjacent the door openings, one of the plurality of the linkage arms sealingly engaging the left and right door brackets.

5. The retractable top of claim 2, wherein the substantially vertical base plates have adjustment slots allowing the retractable top to be adjustably positioned forwardly and rearwardly within the rear compartment.

6. The retractable top of claim 2, wherein the substantially vertical base plates have adjustment slots allowing the retractable top to be adjustably positioned vertically within the rear compartment.

7. The retractable top of claim 1, wherein the means for removably locking the retractable top to the vehicle's windscreen further comprises right and left windscreen brackets attachable to the vehicle's windscreen and right and left windscreen clips locking the retractable top to the respective right and left windscreen brackets.

8. A retractable top for a vehicle, the vehicle resting on the ground, the vehicle having an open passenger compartment with a windscreen and door openings and an open rear compartment rearward of the passenger compartment, the rear compartment having a floor, the retractable top comprising:
   a) a pair of substantially horizontal support plates attachable to the floor of the rear compartment and a substantially vertical base plate attachable to each of the substantially horizontal support plates;
   b) a plurality of expanding linkage arms adapted to moving the retractable top from a fully retracted position in which the retractable top is folded upon itself within the open rear compartment to a fully deployed position covering the passenger compartment; and c) right and left windscreen brackets attachable to the vehicle's windscreen and right and left windscreen clips locking the retractable top to the respective right and left windscreen brackets.

9. The retractable top of claim 8, wherein the plurality of linkage arms are so arranged that one of the plurality of linkage arms remains substantially parallel to the ground as the retractable top is moved from the fully contracted position to the fully deployed position.

10. The retractable top of claim 8, further comprising left and right door brackets attachable to the vehicle adjacent the door openings, one of the plurality of the linkage arms sealingly engaging the left and right door brackets.

11. The retractable top of claim 8, wherein the substantially vertical base plates have adjustment slots allowing the retractable top to be adjustably positioned forwardly and rearwardly within the rear compartment.

12. The retractable top of claim 8, wherein the substantially vertical base plates have adjustment slots allowing the retractable top to be adjustably positioned vertically within the rear compartment.

13. A retractable top for a vehicle, the vehicle having an open passenger compartment with a windscreen and door openings and an open rear compartment rearward of the passenger compartment, the rear compartment having a floor, the retractable top comprising:

a) a pair of substantially horizontal support plates attachable to the floor of the rear compartment;

b) a substantially vertical base plate attachable to each of the support plates;

c) first and second linkage arms pivotally attached to each of the substantially vertical base plates at first and second pivot points, the first and second linkage arms being in spaced parallel relation to one another;

d) a third linkage arm pivotally attached to the first and second linkage arms at third and fourth pivot points, the third linkage arm having a first end and a second end;

e) a fourth linkage arm pivotally attached to the third linkage arm intermediate the first and second ends, the fourth linkage arm having a first end and a second end;

f) a fifth linkage arm pivotally attached to the fourth linkage arm intermediate the first end and second end of the fourth linkage arm, and to the first linkage arm;

g) a sixth linkage arm pivotally attached to the fourth linkage arm at the second end of the fourth linkage arm;

h) a windscreen and top frame pivotally attached to the sixth linkage arm and to the third linkage arm;

i) right and left windscreen brackets attachable to the vehicle's windscreen;

j) right and left windscreen clips locking the windscreen and top frame to the respective right and left windscreen brackets; and k) a fabric cover attachable to the windscreen and top frame;

whereby the retractable top is movable between a fully retracted position in which the retractable top is folded upon itself into the rear compartment and a fully deployed position in which the retractable top covers the passenger compartment.

14. The retractable top of claim 13, wherein the plurality of linkage arms are so arranged that one of the plurality of linkage arms remains substantially parallel to the ground as the retractable top is moved from the fully contracted position to the fully deployed position.

15. The retractable top of claim 13, further comprising left and right door brackets attachable to the vehicle adjacent the door openings, one of the plurality of the linkage arms sealingly engaging the left and right door brackets.

16. The retractable top of claim 13, wherein the substantially vertical base plates have adjustment slots allowing the retractable top to be adjustably positioned forwardly and rearwardly within the rear compartment.

17. The retractable top of claim 13, wherein the substantially vertical base plates have adjustment slots allowing the retractable top to be adjustably positioned vertically within the rear compartment.

18. The retractable top of claim 13, wherein the third linkage arm remains substantially parallel to the ground as the retractable top is moved from the fully retracted position to the fully deployed position.

19. The retractable top of claim 15, wherein the third linkage arm has a curved portion, the left and right door brackets have curved portions, and the curved portion of the third linkage arms sealingly engage the curved portions of the left and right door brackets.

* * * * *

UNITED STATES PATENT AND TRADEMARK OFFICE
CERTIFICATE OF CORRECTION

PATENT NO.   : 6,439,643 B2
DATED        : August 27, 2002
INVENTOR(S)  : Dennis G. Barker It is certified that error appears in the above-identified patent and that said Letters Patent is hereby corrected as shown below:

<u>Column 1,</u>
Line 20, please delete "wrangle®" and insert in its place -- Wrangler® --.

<u>Column 2,</u>
Line 32, please delete "0" and insert in its place -- O --.

Signed and Sealed this

Thirty-first Day of December, 2002

JAMES E. ROGAN
*Director of the United States Patent and Trademark Office*

(12) EX PARTE REEXAMINATION CERTIFICATE (6156th)
United States Patent
Barker

(10) Number: US 6,439,643 C1
(45) Certificate Issued: Mar. 18, 2008

(54) MECHANISM FOR THE RETRACTABLE TOP OF AN OPEN AUTOMOBILE

(75) Inventor: Dennis G. Barker, Aspen, CO (US)

(73) Assignee: Aspen Barker Top, LLC, Aspen, CO (US)

Reexamination Request:
No. 90/008,725, Aug. 8, 2007

Reexamination Certificate for:
Patent No.: 6,439,643
Issued: Aug. 27, 2002
Appl. No.: 09/750,931
Filed: Dec. 28, 2000

Certificate of Correction issued Dec. 31, 2002.

Related U.S. Application Data
(60) Provisional application No. 60/175,253, filed on Jan. 10, 2000.

(51) Int. Cl.
*B60J 7/08* (2006.01)
*B60J 7/12* (2006.01)
*B60T 7/12* (2006.01)

(52) U.S. Cl. .................. 296/116; 296/107.09; 296/121
(58) Field of Classification Search ....................... None
See application file for complete search history.

(56) References Cited

U.S. PATENT DOCUMENTS

| | | |
|---|---|---|
| 3,036,859 A | 5/1962 | Adamski |
| 3,297,357 A | 1/1967 | Adamski |
| 3,405,970 A | 10/1968 | Doka |
| 3,453,021 A | 7/1969 | Adamski |
| 4,720,133 A | 1/1988 | Alexander et al. |
| 5,026,110 A | 6/1991 | Koop et al. |
| 5,286,077 A | 2/1994 | Kinnanen |
| 5,816,644 A | 10/1998 | Rothe et al. |
| 6,295,713 B1 | 10/2001 | Hilliard et al. |

*Primary Examiner*—Peter C. English

(57) ABSTRACT

A retractable top for a Jeep® CJ-7® or Wrangler® or other vehicle with an open passenger compartment and an open rear compartment. The top attaches to the floor of the open rear compartment. A number of expanding linkage arms allow the cover to be deployed forwardly over both the rear compartment and the passenger compartment. Windscreen brackets fasten the cover to the vehicle's windscreen.

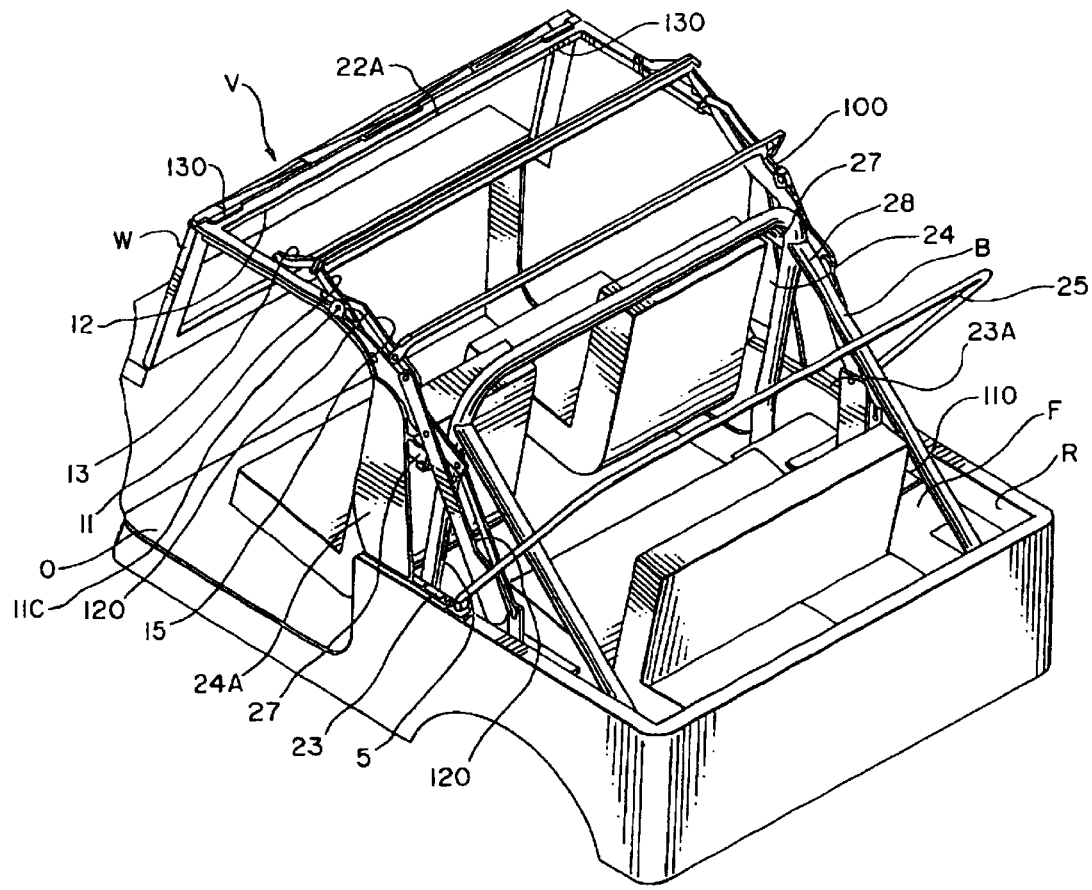

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–19 is confirmed.

* * * * *